United States Patent Office 3,297,558
Patented Jan. 10, 1967

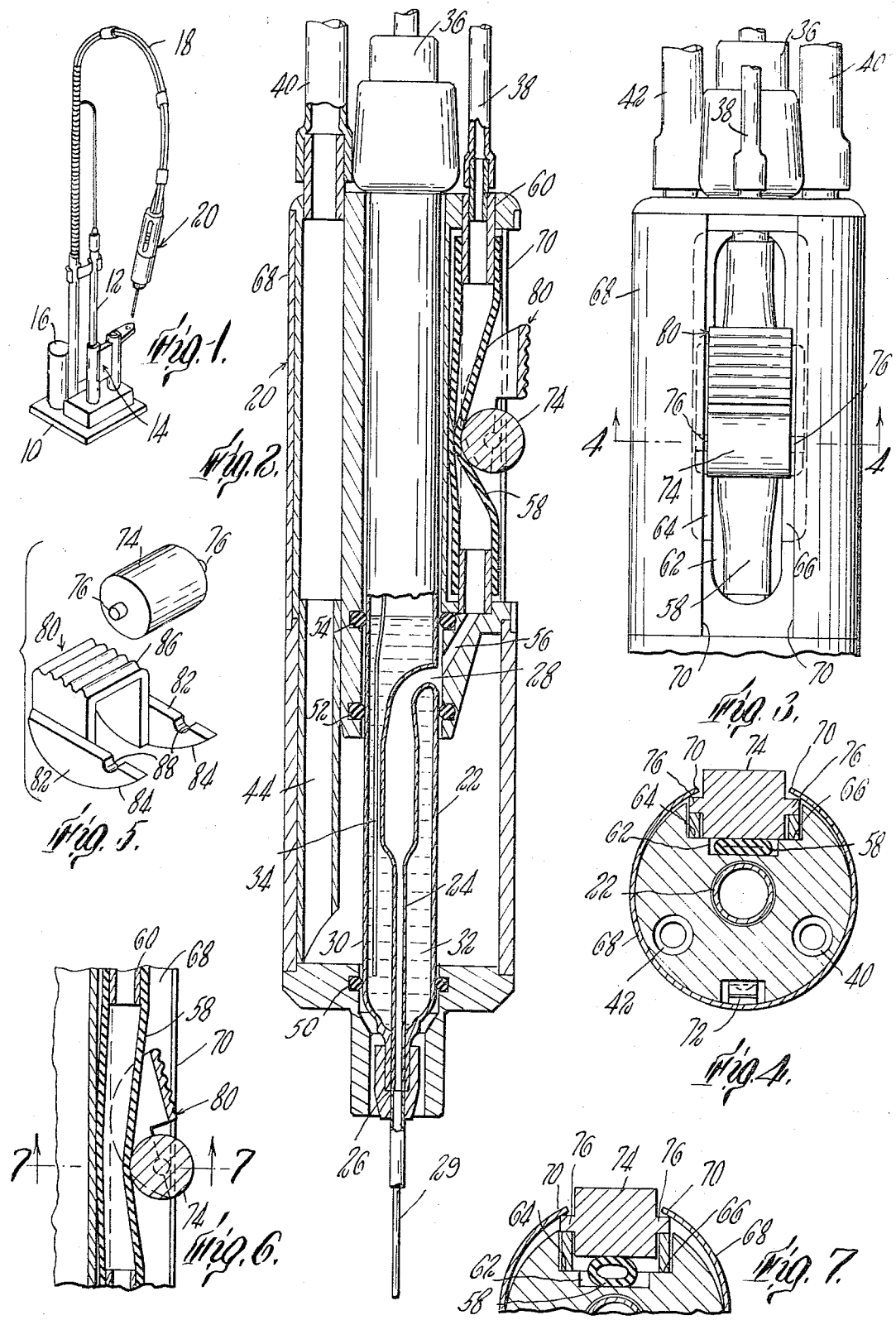

3,297,558
FLUID CONTROL APPARATUS
Warren K. Hillquist, Boston, Mass., assignor to Instrumentation Laboratories Inc., a corporation of Massachusetts
Filed Mar. 12, 1965, Ser. No. 439,206
9 Claims. (Cl. 204—195)

This invention relates to fluid control apparatus and more particularly to apparatus for controlling the placing of fluid samples in a chamber for analysis.

It is frequently desired to make a pH measurement on a small blood sample. For this purpose an electrode structure has been designed in which a sample chamber of pH sensitive glass is provided. The sample to be analyzed is drawn into the capillary section and an electric potential is impressed across the wall of the sample chamber, using the blood sample as a portion of the electrical conductive circuit. Measurement of the electrical parameters of the circuit enables the pH of the sample to be determined.

The placing of the sample to be analyzed in the sample chamber is usually done by aspiration (suction). The aspirating process must be carefully controlled in order to insure that the integrity of the sample is not impaired, and particularly that one or more bubbles are not formed in the sample disposed in the chamber. For example, if there should be a gap (bubble) in the sample, the parameters of the electrical circuit will be distorted. Prior aspirating apparatus for this purpose have generally utilized a vacuum pump and an on-off valve to control the connection of the pump to the sample chamber and the sample is sucked into the chamber when the valve is opened. Such arrangements do not provide sensitive control of the positioning of the sample in the chamber. Also the flow through such devices is unidirectional and should a bubble form in the sample or the sample be otherwise defective in a minor respect, the entire sample must be discarded and a new sample obtained.

It is accordingly an object of this invention to provide novel and improved apparatus for controlling the placing of fluid specimens in sample chambers for analysis purposes.

Another object of the invention is to provide novel and improved aspirating control apparatus for placing a specimen to be analyzed in an analysis chamber with precision and sensitivity.

Still another object of the invention is to provide novel and improved apparatus of analyzing fluid microsamples.

A further object of the invention is to provide novel and improved apparatus for obtaining fluid samples for pH analysis.

In accordance with the invention there is defined a passage for connection between a pressure source (typically but not necessarily a negative pressure) and a sample chamber. This passage includes a flexible tubular portion and a control device, preferably in the form of a roller, is biased against this flexible tubular portion to impose a transverse restriction in the passage between the pressure source and the sample chamber. The control device is arranged so that it may be moved along the tube in the axial direction to change the volume of the tubular portion between the sample chamber and the control device. By moving the control device away from the sample chamber, a pressure differential is created which effectively draws the sample into the chamber through the end remote from the control device. Preferably the control device acts to seal the tube completely to insure that the sample is securely held in the chamber against the force of gravity. By moving the control device towards the sample chamber, the sample may be forced out of the chamber in the reverse direction. The movement of the sample to or from the chamber can be precisely and sensitively controlled by the movement of the control device as a function of the volume of the passage between the control device and the sample chamber.

A further feature of the apparatus is that the arrangement allows the release of the control device to expose the passage and sample chamber to the full effect of the pressure source so that the sample, after analysis, may be readily removed from the sample chamber and that chamber then cleaned by passing a cleaning solution through the sample chamber in preparation for a further test. The structure of the invention is simple in construction and reliable in operation. It affords greater control of aspirating microsamples than the devices heretofore employed for this purpose.

Other features, objects and advantages of the invention will be seen as the following description of a particular embodiment thereof progresses, in conjunction with the drawing, in which:

FIG. 1 is a perspective diagrammatic view of a blood pH electrode assembly constructed in accordance with the invention;

FIG. 2 is a sectional view of the electrode holder showing details of the aspirating control apparatus constructed in accordance with the invention;

FIG. 3 is a side view of the aspirating control apparatus embodied in the apparatus shown in FIG. 2;

FIG. 4 is a sectional view of the aspirating control taken along the line 4—4 of FIG. 3;

FIG. 5 is a perspective view of the roller and release control of the aspirating control apparatus;

FIG. 6 is a sectional view similar to a portion of FIG. 2 showing the aspirating control in a released position; and FIG. 7 is a sectional view taken along the line 7—7 of FIG. 6 showing the released position of the aspirating control.

The apparatus as shown diagrammatically in FIG. 1 includes a stand 10 for holding the reference electrode 12, a salt bridge structure 14, a source 16 of negative pressure (vacuum pump), and a flexible support arm 18 on which is mounted the electrode housing assembly 20, and tubing and electrical conductors.

That housing assembly as shown in greater detail in FIGS. 2 and 3 receives a measuring electrode assembly 22 which houses a sample chamber including a capillary section 24 0.5 mm. in diameter and about five centimeters in length. This sample chamber has an entrance port 26 at the lowest end of the electrode assembly and an exhaust port 28 in a side wall of the electrode assembly. (A sampling tip 29 projects below the entrance port 26.) The section 24 of the chamber is of a special pH glass and the chamber is surrounded by an envelope 30. Disposed within the envelope 30 is an electrolytic solution 32 and extending down from the top of the electrode element is an electrode 34 that has its lowest end submerged in the electrolytic solution adjacent capillary section 24. The electrode 34 is connected through connector 36 on top of the electrode assembly to the flexible support arm 18 to the unit.

Other connections extending from the support assembly through the flexible support arm 18 include a tube 38 to the vacuum pump 16 and two tubes 40, 42 which connect supply and drain passages to a water jacket 44 which surrounds the sample chamber section 24. The electrode support housing in addition to including the water jack section, includes a central passage from the electrode assembly 22. A first O ring 50 seals the lower end of the central passage and two other O rings 52, 54 are disposed to seal the side port 28 when the electrode assembly is positioned in the support housing. These O rings secure the electrode assembly firmly within the housing 20.

Between the O rings 52 and 54 within housing 20 is a passage section 56 which is connected by means of a flexible tube 58 of approximately 5/36 inch I.D. and coupling 60 to the vacuum line 38. This tube 58 is disposed in a channel that has a depression 62 in it, on either side of which is a track surface 64, 66 (FIG. 4). The depth of depression 62 is slightly less than twice the wall thickness of tube 58. Surrounding the upper part of the housing assembly adjacent this channel is a spring clip 68 which is frictionally secured in a recess in the housing wall. The clip is C-shaped and its edge portions 70 (which function as guide surfaces) are disposed on either side of and above the edges of the channel in which the flexible tube 58 is positioned. A spring 72 engages the clip 68 and is connected externally of the housing to provide electrostatic shielding.

Also disposed in the channel is a roller 74 which has trunnion elements 76 extending from either side thereof as indicated in FIG. 5. The roller is seated on track surfaces 64, 66 and the trunnions engage and are secured under the edge portions 70 of clip 68 so that the clip normally urges the roller down to collapse the tube 58 as indicated in FIG. 4. The track surfaces 64, 66 also function as guides to support the roller 74 for rotation about the trunnions 76 and movement along the channel.

An operator element 80 shown in FIG. 5 is also received in the channel adjacent roller 74. That operator elements has two side walls 82, each of which has an arcuate lower surface 84, and the side walls are joined by a ribbed bridge portion 86. A groove 88 is formed in the upper portion of each side wall in which the trunnion elements 76 ride when the control element 80 is positioned as indicated in FIGS. 2 and 3. In that position, the edges 70 of the spring clip 68 act against the trunnion portions 76 of the roller and urge the roller down into the channel, compressing the flexible tube 58 to the position shown in FIG. 4. In this position, as indicated in FIG. 2, the operator element 80 does not act against the force of the spring, but rather is pivoted on surfaces 84 which contact base 62 (in a clockwise direction as indicated in FIG. 2) so that it does not impede the collapsing effect of the roll 74 on the tube 58 as that roller is forced onto the tracks by spring 68.

As indicated in FIGS. 2 and 4, in this position the tube 58 is completely collapsed and divides the passage between pump 16 and sample chamber 24 into two sections, one above the roller 74 and a second below the roller. The volume of these sections may be varied by moving the roller axially along tube 58. Such axial movement is produced by finger pressure on roller 74. It will be noted that a 2/1 mechanical advantage is provided with respect to axial movement of the roller. As the roller is moved upwardly, the volume of the passage section between the roller and the sample chamber is increased and causes a sample in contact with the exposed end of the passage (tip 29) to be drawn through the passage into the sample chamber 24 in a suction operation. The sample should be exposed at the end of tip 29 and preferably form a slightly positive meniscus at that point. This can easily be accomplished by moving the roller 74 down a short distance. Should a bubble form during the aspiration operation or the take-up of the sample not be perfect in other respects, the sample can be manipulated to restore its integrity, for example, by a series of motions in opposite directions. (The lengths of the capillary section 24 and the flexible tube 58 are approximately the same but the cross-sectional area of tube 58 is more than one hundred times that of the capillary chamber so that a relatively small movement of roller 74 will completely induct or eject a simple from the sample chamber 24.) To remove the sample from the electrode assembly all that need be done is to depress the bridge of operator element 80 (as indicated in FIGS. 6 and 7) which tends to raise the roller 74 against the retaining force of the spring element and open the tube 58 to the vacuum source so that the sample may be sucked out of the tube quickly and directly.

It will be noted that this aspiration control is performed without the introduction of any extraneous materials into the electrode sample chamber and the wall of the sample passage remains closed at all times. No lubrication is necessary and therefore contaminants will not be introduced into the sample chamber from such source.

While a particular embodiment of the invention has been shown and described, various modifications thereof will be obvious to those skilled in the art. Therefore, it is not intended that the invention be limited to the disclosed embodiment or to details thereof and departures may be made therefrom within the spirit and scope of the invention as defined in the claims.

What is claimed is:

1. Control apparatus for use with a structure defining a through passage, said through passage including a chamber for holding a liquid sample to be analyzed, a pressure source, and
   a conduit connecting the through passage of said structure to said pressure source, comprising
   a holder receiving said through passage defining structure,
   a channel in said holder for receiving a flexible tubular portion of said conduit,
   a guide surface on said holder extending parallel to said channel,
   and a roller disposed over said channel for movement in a direction controlled by said guide surface,
   said roller cooperating with said guide surface to compress said tubular portion and block flow therethrough, said guide surface maintaining the blocking action in said tubular portion as said roller is moved along said guide surface,
   and an operator element for lifting said roller away from said tubular portion to reduce the compressing action of said roller on said tubular portion and permit flow through said tubular portion under the influence of said pressure source.

2. The apparatus as claimed in calim 1 wherein said operator element is connected to said roller for movement therewith as said roller is moved along said guide surface and said operator element includes an arcuate surface adapted to engage a holder surface and on which said operator element and roller may be rocked to reduce the compression on said tubular portion.

3. Aspiration control apparatus comprising a vacuum pump, a sample chamber, a support assembly for said sample chamber, a channel in one wall of said support assembly, a conduit connecting said sample chamber to said vacuum pump, said conduit including a flexible portion disposed in said channel, a roller disposed in said channel, biasing means pressing said roller down against said flexible portion to provide a compression seal between said sample chamber and said vacuum pump, said biasing means permitting said roller to be manually manipulated for movement along said channel to change the location of the compression of said flexible portion while maintaining the seal between said sample chamber and said vacuum pump and an operator element coupled to said roller for lifting said roller and removing the compression of said roller on said flexible portion to directly connect said sample chamber to said vacuum pump to withdraw fluid in said sample chamber through said flexible portion.

4. The apparatus as claimed in claim 3 wherein said biasing means is a metal strip and further including means to ground said strip to provide an electrostatic shield for said through passage defining structure.

5. Sample analysis apparatus comprising a structure defining a through passage, said through passage including a chamber for holding a liquid sample to be analyzed, a pressure source, a conduit connecting the through passage of said structure to said pressure source, and a holder receiving said through passage defining structure, a channel in said holder, a flexible tubular portion of said conduit disposed in said channel, a guide surface on said holder extending parallel to said channel, a roller disposed over said channel for movement along said guide surface, said guide surface including biasing means for urging said roller into said channel to compress said tubular portion and block flow therethrough, said biasing means maintaining the blocking action in said tubular portion as said roller is moved along said guide surface, and an operator element for lifting said roller away from said tubular portion to reduce the compressing action of said roller on said tubular portion and permit increased flow through said tubular portion under the influence of said pressure source.

6. Aspiration control apparatus for pH analysis comprising a vacuum pump, a pH electrode having a sample chamber of pH sensitive material surrounded by an electrolytic solution, and an electrode disposed in said electrolytic solution, a support assembly receiving said pH electrode including a water jacket portion adapted to surround said sample chamber when said pH electrode is disposed in said support assembly, a channel in one wall of said support assembly, a guide surface disposed on either side of said channel, a conduit connecting said sample chamber of sadi pH electrode to said vacuum pump when said pH electrode is disposed in said support assembly, said conduit having a flexible tubular portion disposed in said channel, a roller disposed in said channel for compressing said flexible portion to provide a seal between said sample chamber and said vacuum pump, said roller having trunnions projecting axially therefrom in opposite directions, a C-shaped spring disposed over said support assembly along the length of said channel, said spring having edges disposed generally parallel to the length of said channel, said edges being arranged to engage said trunnions and press said roller down into said channel to provide the compression on said flexible portion so that said roller may be manually manipulated for movement along said channel while maintaining said seal to change the location of said seal of said flexible portion, and an operator element disposed in said channel having side wall portions for disposition between said trunnions and said holder with the lower surfaces of said side walls being of arcuate configuration so that said operator element may be rocked to lift said roller and remove the compressing force of said roller on said flexible portion to directly connect said sample chamber to said vacuum pump to withdraw fluid in said sample chamber through said flexible portion.

7. The apparatus as claimed in claim 6 wherein said spring is a metal clip and further including means to ground said clip to provide an electrostatic shield for said sample electrode structure.

8. Apparatus for placing a sample of material to be analyzed in a sample chamber, comprising a conduit connecting said sample chamber to a pressure source, said conduit including a flexible portion, structure defining a channel in which said flexible portion is disposed, a guide surface on each side of said channel, and a control device disposed for movement along said channel, said guide surfaces positioning said control device relative to said flexible portion to compress said flexible portion and block flow therethrough between said sample chamber and said pressure source, said control device being arranged for movement along said channel to vary the volume of the passage between said chamber and said control device while said guide surfaces act on said control device to maintain the blocking action in said flexible portion and draw a sample into said chamber in response to movement of said control device along said flexible portion, said control device being movable away from a channel surface to reduce the compressing action of said control device on said flexible portion and permit flow through said flexible portion between said sample chamber and said pressure source to remove material from said sample chamber under the influence of said pressure source.

9. Aspiration control apparatus for sample analysis comprising a vacuum pump, a sample chamber, a support assembly for receiving said sample chamber, a channel in said support assembly, a guide surface disposed on each side of said channel and including a line element extending generally parallel to said channel, a conduit connecting said sample chamber to said vacuum pump when said sample chamber is disposed in said support assembly, said conduit having a flexible portion disposed in said channel, a roller compressing said flexible portion to provide a seal between said sample chamber and said vacuum pump, said roller having trunnions projecting axially therefrom in opposite directions for engagement with said guide surfaces so that said flexible portion is compressed between a channel surface and said roller, said roller being arranged for manually manipulated movement along said channel while maintaining said seal to change the location of said seal to draw a sample into said sample chamber and said roller being arranged for relative movement away from said channel surface to remove the compressing force of said roller on said flexible portion to directly connect said sample chamber to said vacuum pump to withdraw fluid in said sample chamber through said flexible portion.

References Cited by the Examiner
UNITED STATES PATENTS

| | | | |
|---|---|---|---|
| 1,553,859 | 9/1925 | Hein | 103—149 |
| 1,863,994 | 6/1932 | Parietti | 103—149 |
| 1,959,074 | 5/1934 | Bloxsom | 251—6 |
| 2,825,333 | 3/1958 | Broman | 128—214 |
| 2,987,004 | 6/1961 | Murray | 103—149 |
| 2,989,076 | 6/1961 | Rohmann | 251—6 |
| 3,147,081 | 9/1964 | Stevenson et al. | 23—230 |
| 3,232,496 | 2/1966 | Rockwell et al. | 103—148 |

FOREIGN PATENTS 994,857   8/1951   France.

JOHN H. MACK, *Primary Examiner.*

T. H. TUNG, *Assistant Examiner.*